United States Patent
Chang

[19]

[11] Patent Number: 5,873,298
[45] Date of Patent: Feb. 23, 1999

[54] DUAL-FUNCTION FILTER TYPE POT COVER

[76] Inventor: Kwei-Tang Chang, No. 14, Lane 54, Luong Chuan St., Panchiao City, Taipei Hsien, Taiwan

[21] Appl. No.: 102,667

[22] Filed: Jun. 23, 1998

[51] Int. Cl.$^6$ .............................. A47J 27/04; A47J 37/12; B01D 46/10; B65D 51/16
[52] U.S. Cl. .............................. 99/340; 55/385.4; 55/501; 55/511; 55/529; 55/DIG. 31; 99/341; 99/342; 99/403; 220/212; 220/367.1; 220/371
[58] Field of Search .............................. 99/340, 341, 342, 99/403, 408, 417, 483; 73/334; 55/501, 503, 504, 510, 511, 522, 529, 385.4, 385.6, DIG. 31, DIG. 42; 96/130, 152, 222, 226; 126/299 D, 299 R, 300, 373; 206/363, 438; 210/232, 238, 451, 473, 482, 484, 477, 212, 367.1; 220/212.5, 314, 370–372, 377, 662, 474, 378; 422/292, 310; 426/509–511; 428/40.1, 41.7, 42.1; 454/59

[56] References Cited

U.S. PATENT DOCUMENTS

| | | | |
|---|---|---|---|
| 4,487,117 | 12/1984 | Colley et al. | 99/341 |
| 4,505,194 | 3/1985 | Bishop et al. | 99/407 X |
| 4,520,717 | 6/1985 | Bohrer, Jr. et al. | 99/403 X |
| 4,521,233 | 6/1985 | Vossen | 55/511 |
| 4,657,570 | 4/1987 | Gronholz et al. | 55/385.6 |
| 4,785,725 | 11/1988 | Tate et al. | 99/407 X |
| 4,854,949 | 8/1989 | Giles, Sr. et al. | 99/403 X |
| 4,902,316 | 2/1990 | Giles, Sr. et al. | 99/403 X |
| 4,995,312 | 2/1991 | Leiros | 99/340 |
| 5,178,760 | 1/1993 | Solberg, Jr. | 55/503 X |
| 5,474,679 | 12/1995 | Nichols et al. | 55/504 X |
| 5,585,234 | 12/1996 | Baillieul et al. | 99/403 |
| 5,681,630 | 10/1997 | Smick | 428/40.1 |

*Primary Examiner*—Timothy F. Simone
*Attorney, Agent, or Firm*—Rosenberg, Klein & Bilker

[57] ABSTRACT

The invention relates to a dual-function filter type pot cover, comprising an outside plate, an inside plate, a diverting cover, a filter element and a switching knob, wherein the outside plate, the inside plate and the diverting cover are combined as one, while the switching knob can rotate in relation to the diverting cover, on the inside plate are air vents, on the diverting cover is a separating plate that divide it into a first space with a filter element and a cover plate and a second space with steam holes and an arched guide groove, while on the inner rim of the switching knob is a protruded obstructing plate that is located in the guide groove, so that by rotating the switching knob, when the obstructing plate is away from the steam holes, the steam in the pot will escape without obstruction from the air vent on the inside cover to the first space and out of the steam holes, suitable for cooking food with water, or on the other hand, in case the cooking involves frying with oil, the obstructing plate will obstruct the steam holes, so the oily vapor in the pot may escape from the air vent to the first space, then to the second space, to be filtered by the filter element before clean air is discharged from the air vent on the cover plate.

10 Claims, 9 Drawing Sheets

DUAL-FUNCTION FILTER TYPE POT COVER

BACKGROUND OF THE INVENTION

The invention relates to a dual-function filter type pot cover, particularly to one that can be widely applied to a variety of cooking pots whereby the user may choose to turn a specially designed switching knob to enable complete discharge of steam or filtering of oil vapors depending on different cooling processes involving either water or cooking oil, such as steaming, boiling, frying, deep-frying, stewing, etc.

Conventionally, to achieve thorough cooking efficiency within a minimized time duration by means of high-heat, hypertension cooking utensils, we often see a sealing cover on the pot, for example, a regular stew pot, an electric cooker, a pressurized cooker, or a regular frying pot, however, to facilitate the discharge of water or oily vapors produced by the high-heat cooking water or oil, we would often see a single or a number of air vents designed on the pot cover, but since the foods to be cooked may vary in their category and nature, some requiring water to cook, some requiring oil to fry, so though the air vent has its feature of discharging the steam, oil could not pass through as smoothly, which results in substantial oil stains on the top of pot cover, on the kitchen wall next to the cooking pot, on the ceiling, other furniture items in the immediate surroundings, it looks dirty and needs cleaning.

For that reason, there is available on the market a type of pot that obstructs the discharge of oil vapors, characterized in that, on the inside of the air vent on the pot cover is a replaceable filter element to take up the oil vapors, however, such a filtering method for both water steam or oil vapors will obstruct the discharge of steam vapor, and when the filter element has absorbed the oil or is saturated with oil, water steam will be trapped inside because of the obstructed and obstructing filter element, so it involves danger when steam is not properly discharged or excessively accumulated.

In view of that, the inventor has dedicated in the research, based on experiences in specialized R&D production and marketing of all types of cooking utensils, and after repeated test and actual productions, has finally developed a dual-function filter type pot cover that enables the user to switch to either steam channel mode or oil vapor channel mode to suit actual cooking circumstances.

SUMMARY OF THE INVENTION

The primary objective of the invention is to present a dual-function filter type pot cover, involving mainly a diverting cover containing steam holes and a filter element on the opposite side of an inside plate with air vents, and a switching knob with an obstructing plate protruded on an inner rim edge, so that depending on the types or nature of the foods to be cooked, the switching knob may be rotated to move the obstructing plate away from the steam holes to allow smooth discharge of water steam, or move the obstructing plate to obstruct the steam holes, so oily vapors are guided to flow to the filter element to be filtered before cleansed air can be discharged, so that it is applicable to various types of pot products.

To enable further understanding of the technology, approaches and functions employed in the invention to achieve the above objective, a preferred embodiment of the invention is described in details with references made to the drawings listed below.

BRIEF DESCRIPTION OF NUMERALS

| 1 outside plate | 10 assembling opening |
| 2 inside plate | 20 apron edge |
| 21 lock ear | 22 air vent |
| 3 silicone seal ring | 50 depressive ring |
| 4 filter element | 501 bolt |
| 5 diverting cover | 510 narrow clearance |
| 500 depressive groove | 52 first space |
| 51 separating plate | 530 opening |
| 511 protrusion | 532 support rib |
| 53 second space | 540 air vent |
| 531 top step | 542 catch hook |
| 54 cover plate | 55 flipper groove |
| 541 flipper | 56 guide groove |
| 543 bottom step | 60 catch edge |
| 56 steam hole | |
| 6 switching knob | |
| 61 obstructing plate | |

DETAILED DESCRIPTION OF PREFERRED EMBODIMENT

Figure 1:
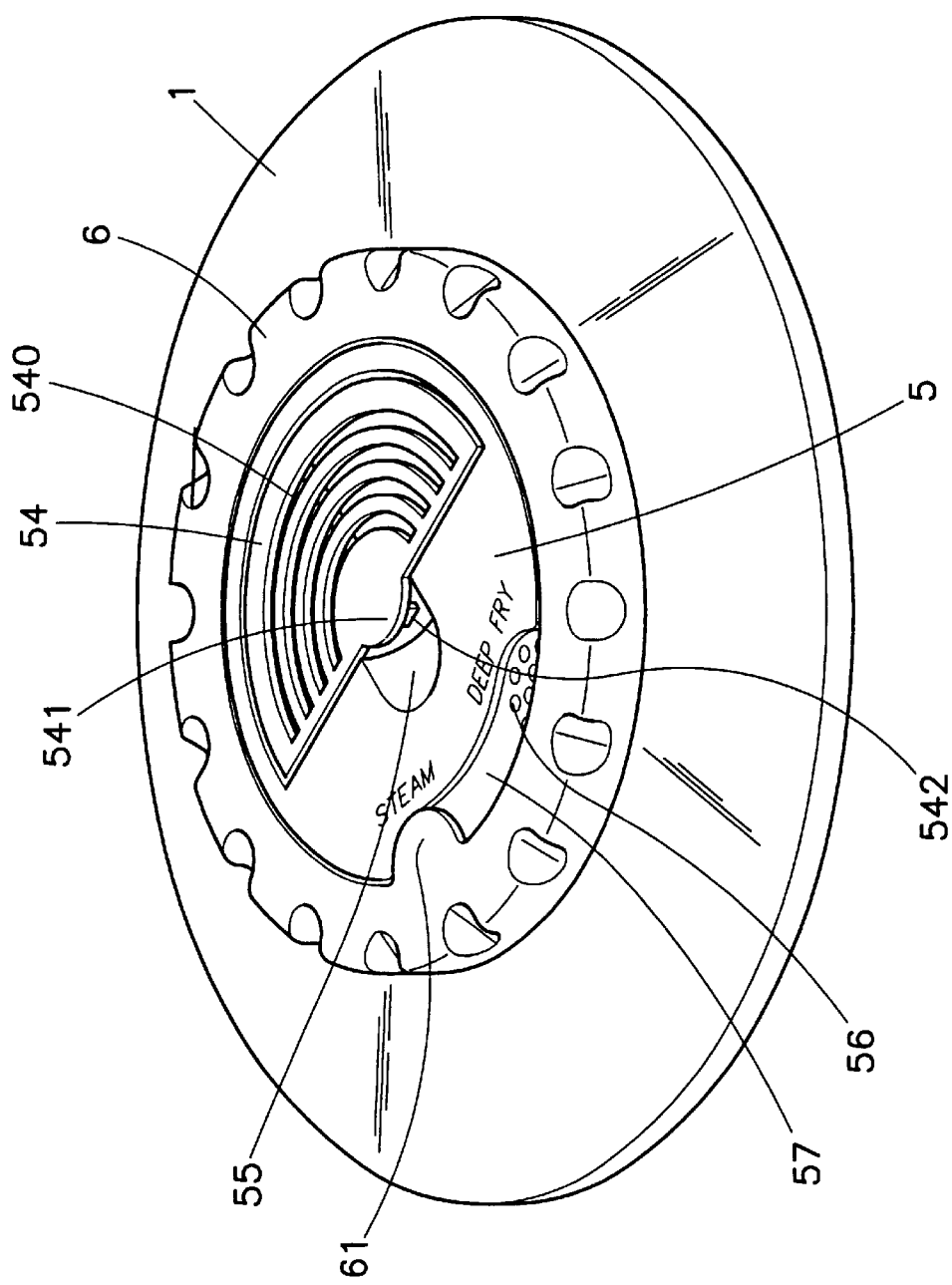
FIG. 1 is a perspective assembled view of the invention.
Figure 2:
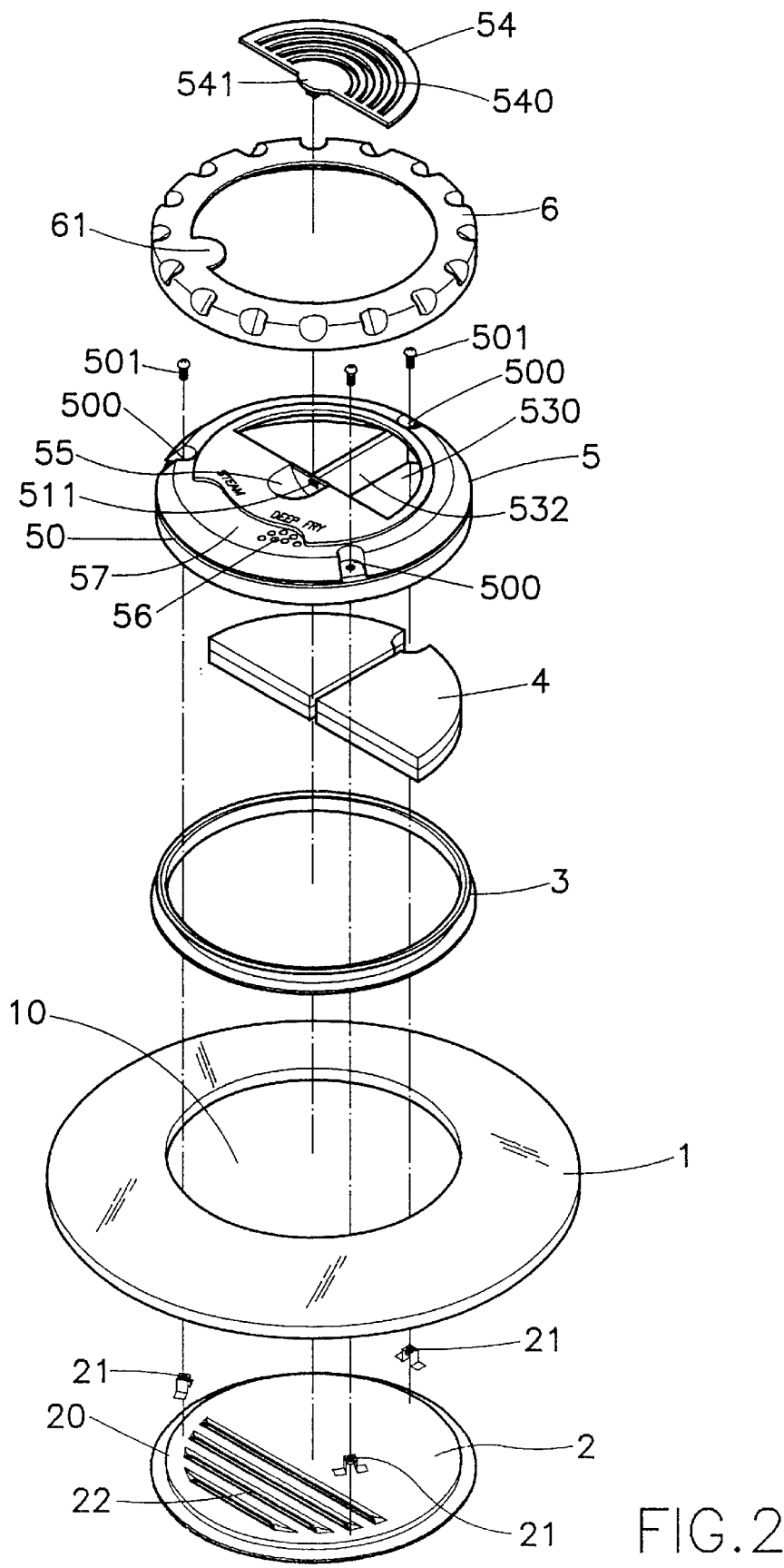
FIG. 2 is an exploded view of the invention.
Figure 4:
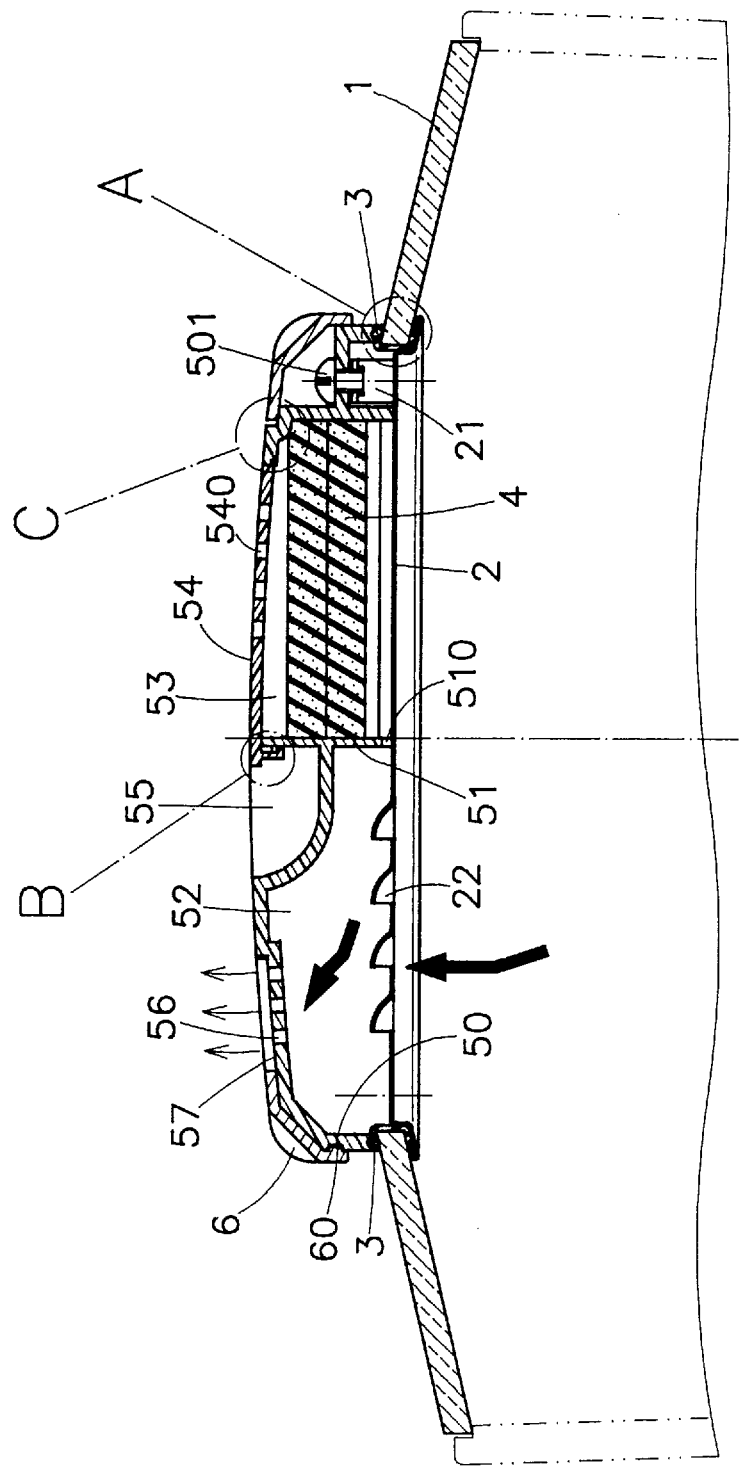
FIG. 4 is a side sectional view of FIG. 3.
Figure 4A:
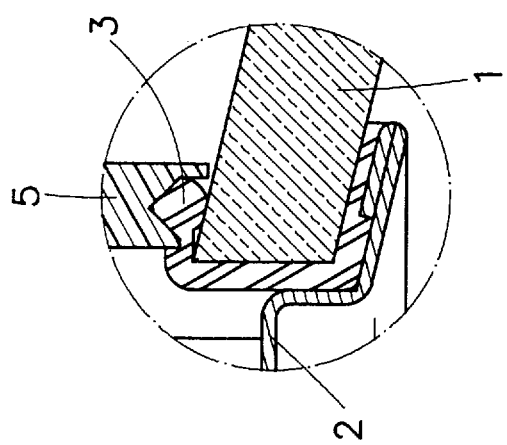
FIG. 4A is a close-up of A in FIG. 4.

Please refer to FIGS. 1 and 2, which illustrate a preferred embodiment of the invention of dual-function filter type pot cover, comprising an outside plate 1, an inside plate 2, a silicone seal ring 3, one or more filter elements 4, a diverting cover 5 and a switching knob 6, wherein:

The outside plate 1 is a regular cover body for a regular pot, with an assembling opening 10 at its center to accommodate the inside plate 2 with its outside rim bent as an L-shaped apron edge 20, and before the inside plate 2 is accommodated, a section roughly U-shaped silicone seal ring 3 is clamped to the edge of the assembling opening 10 (as shown in FIG. 4A), to ensure its sealing efficiency, and on the rim of the inside plate at equal intervals are three lock ears 21 with screw holes, and on one side is an air vent 22.

On the assembling opening 10 of the outside plate 1 is a diverting cover 5, on the rim of said diverting cover 5 is a depressive ring 50, in each of the three depressive grooves 500 located at equal intervals is a screw hole, whereby a bolt 501 can be screwed onto the corresponding lock ear 21 on the inside plate 2.

Figure 4B:
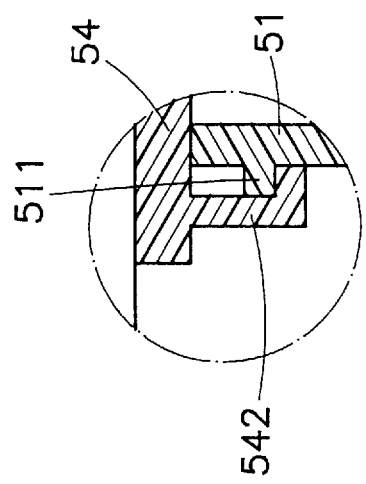
FIG. 4B is a close-up of B in FIG. 4.
Figure 4C:
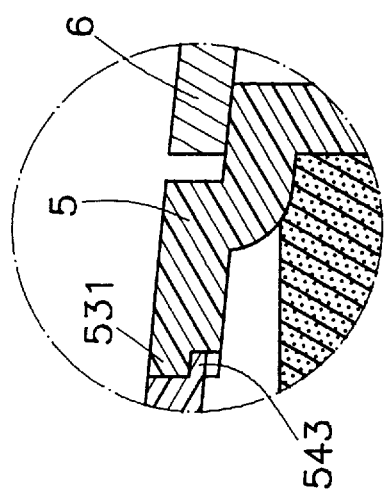
FIG. 4C is a close-up of C in FIG. 4.

Protruding from an imaginary diameter on the bottom side of said diverting cover 5 is a separating plate 51 dividing the bottom space into two semi-circles as a first space 52 and a second space 53, between the separating plate 51 and the inside plate 2 below it is maintained a specified separating narrow clearance 510 with partial communication to each other, wherein on the second space 53 is a filter element 4, on its top is a semi-circular opening 530, meanwhile, a semi-circular cover plate 54 with an air vent 540 is covered onto said opening 530, whereby the cover plate 54 can be opened for replacement of a new filter element 4 when said filter element 4 is saturated with oil. To facilitate convenient lifting of said cover plate 54, a flipper groove 55 may be designed at the center of the diverting cover 5 to enable the insertion by a finger or other pointed object, meanwhile, on the cover plate 54 correspondingly is the protrusion of a flipper piece 541 for the purpose of lifting said cover plate 54; and, to position said cover plate 54, there is another protrusion 511 on the wall of the flipper groove 55, and corresponding to the bottom of the flipper piece 541 is a catch hook 542 to facilitate their fastening purpose (as shown in FIG. 4B); then, at the back edge of the opening 530 is a top step 531 in the shape of a figure "", and on the back edge of the cover plate 54 is a bottom step 543 in the shape of a figure "", thus the top step and the bottom step can be lap joined (as shown in FIG. 4C); then in the opening 530 may be a support rib 532, so the cover plate 54 will not only be lifted conveniently, but will be positioned steadily without falling off after it is depressed. Furthermore, on the diverting cover 5 on the other side of the cover plate 54 are a number of steam holes 56, and on the surface of where said steam holes 56 are located is a depression and formation of an arched guide groove 57, the steam holes 56 is located at one end of said arched guide groove 57.

Figure 6:
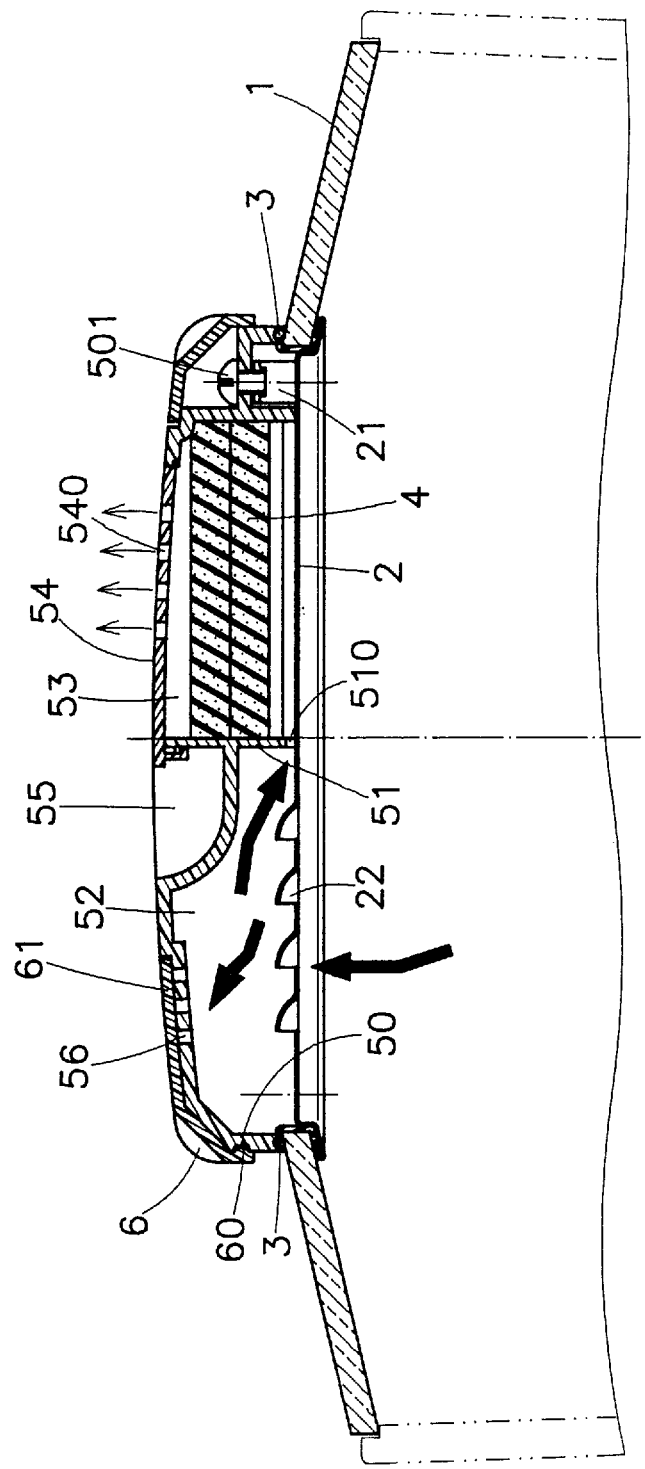
FIG. 6 is a side sectional view of FIG. 5.

Finally, a ring-shaped switching knob is covered onto the diverting cover 5, by putting the catch edge 60 designed on the inner rim into the depressive ring 50 on the rim of the diverting cover 5, so it will be able to rotate freely corresponding to the diverting cover 5 (as shown in FIGS. 4, 6), but at an appropriate location on the inside rim is the protrusion of an obstructing plate 61 located at the center of said arched guide groove 57, by turning the switching knob 6, the obstructing plate 61 will be able to move inside the guide groove 57, to timely seal the steam hole 56 or move away from the steam hole 56.

Figure 3:
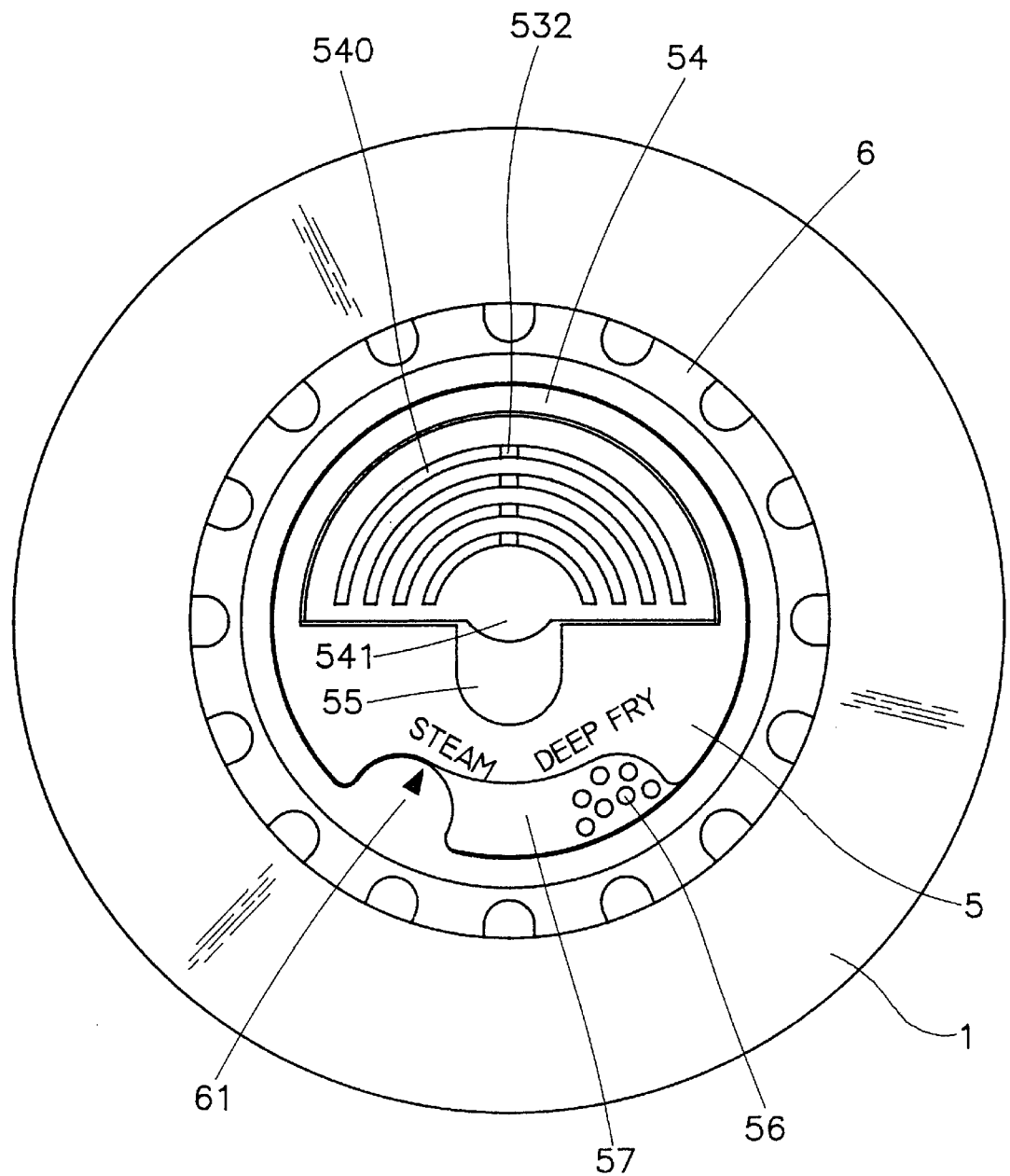
FIG. 3 is a top view of the invention of switching knob when switched to STEAM mode.

As shown in FIGS. 3 and 4, when the switching knob 6 is so turned that its obstructing plate is aligned to the reference spot with the marking "STEAM", as shown in drawing, it is in a steam-channel mode, in other words, all steam holes 56 are fully open, so that almost all the steam can be discharged from the air vent 22 on the inside plate 2 to the first space 52 before it directly escapes out of all the steam holes 56 on the top without any obstruction, therefore, it is suitable for occasions where a large amount of steam will be produced in the cooking of foods mainly employing water in a steaming or boiling process.

Figure 5:
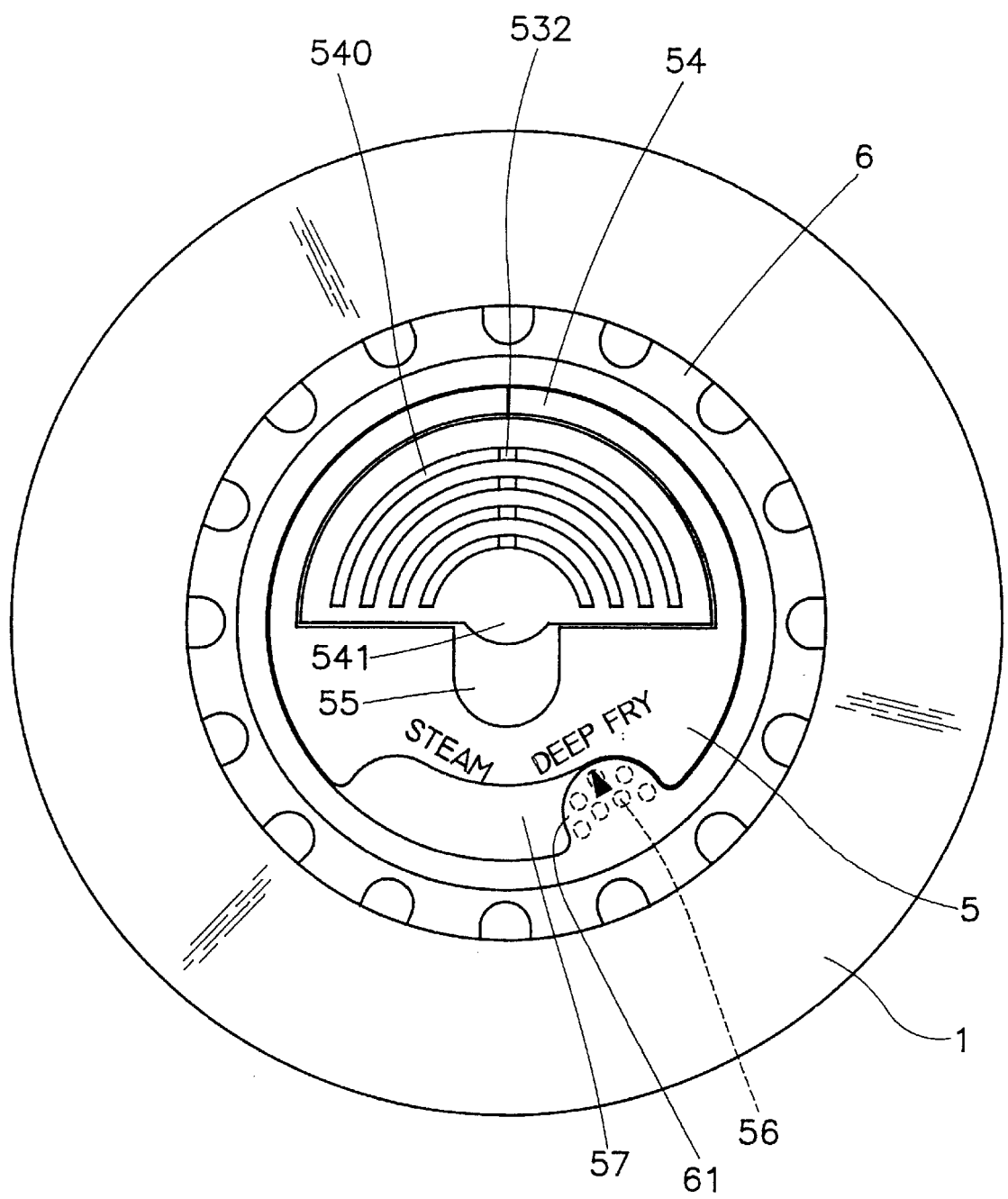
FIG. 5 is a top view of the invention of switching knob when switched to DEEP FRY mode.

In case the foods to be cooked involve a large amount of oil, such as in a stir-frying, deep-frying, or a stewing process, as shown in FIGS. 5 and 6, the switching knob 6 is switched to the spot marked "DEEP FRY" in the drawing, so the obstructing plate 61 will obstruct the steam holes 56, then the oily vapor produced in the pot will flow from the air vent 22 into the first space 52 and when it is trapped there, it will revert to the narrow clearance 510 below the separating plate 51 and to the second space 53, then it is absorbed by the obstructing plate 4 to filter the oil stain, and finally the cleansed air and water vapor escape from the air vent 540 on the cover plate 54, thus oil vapors will not contaminate the pot cover and ambient indoor environment.

Summing up, the invention of dual-function filter type pot cover will effectively provide double functions to the consumer who will be able to switch either to a steam mode or an oil vapor mode depending on different cooking processes, to maintain a clean environment, therefore, its applicability and originality can be concluded, besides, the original construction of the invention has not yet been disclosed in similar products or been used in public, nor is it disclosed in any publication before the subject application, so its novelty can also be concluded, hence this application is duly filed according to the law. Your favorable consideration should be appreciated.

I claim:

1. A dual-function filter type pot cover, comprising:

an outside plate, which is a main unit or a part thereof, with an assembling opening at its center;

an inside plate, on one half of which are air vent holes, which is fixed to the assembling opening of said outside plate;

a diverting cover, fixed to the assembling opening on the outside plate and in connection with the inside plate, its bottom side being divided by a separating plate into a first space and a second space, the first space communicating directly to the air vent on said inside plate and on its top are steam holes, while the second space accommodating a filter element and being partially communicating with the first space;

a switching knob that is mounted on the diverting cover, that will rotate in relation to the diverting cover, on its inner rim at an appropriate location is an obstructing plate, which can be rotated to timely open the steam holes on the diverting cover to allow the water steam in the pot to escape without obstruction from the air vent on the inside plate to the first space and out of the steam holes, or the steam holes can be timely obstructed so the oily vapor could escape from the first space to the second space, then filtered by the filter element before it becomes clean air and comes out of the pot.

2. The dual-function filter type pot cover, as recited in claim 1, wherein the surface with the air vent on the diverting cover is a depression to form an arched guide groove, so the air vent is located at one end of said guide groove, and an obstructing plate of the switching knob is accommodated in said guide groove to move.

3. The dual-function filter type pot cover, as recited in claim 1, wherein the second space on the diverting cover containing the filter element has a top opening, on which is a cover plate with air vents.

4. The dual-function filter type pot cover, as recited in claim 3, wherein at the center on the front edge of the diverting cover opening is a depressive flipper groove, on the cover plate correspondingly is a flipper, so designed that the user may insert his finger or a pointed object to lift the cover plate.

5. The dual-function filter type pot cover, as recited in claim 4, wherein on the inside wall of the flipper groove is a protrusion, the flipper on the cover plate having a corresponding catch hook, to facilitate their fastening.

6. The dual-function filter type pot cover, as recited in claim 3 or 5, wherein in the opening of the diverting cover is a support rib, the rear edge of the opening is formed as a top step, while the rear edge of the cover plate is correspondingly formed as a bottom step, so that the cover plate may be lap joined and positioned securely in place.

7. The dual-function filter type pot cover, as recited in claim 1, wherein a section formed "U-shaped" silicone seal ring may be clamped onto the edge of said assembling opening before the inside plate is fitted to the outside plate assembling opening, to ensure secure sealing efficiency.

8. The dual-function filter type pot cover, as recited in claim 1, wherein on the rim of the inside plate are a specified number of lock ears with screw holes located at equal intervals, on the rim of the diverting cover correspondingly are respective screw holes, wherein bolts are used to tighten the diverting cover and the inside plate and fit them to the top and bottom sides of the outside plate assembling opening.

9. The dual-function filter type pot cover, as recited in claim 1, wherein on the outer rim of the diverting cover is a depressive ring, on the inside rim of the switching knob is correspondingly a catch edge, wherein the switching knob and diverting cover are mounted to each other and combined, to enable the rotation of the switching knob in relation to the diverting cover.

10. The dual-function filter type pot cover, as recited in claim 1, wherein between the separating plate on the bottom of the diverting cover and the inside plate is a narrow clearance at a specified distance, so that the first space may partially communicate with the second space.

* * * * *